United States Patent [19]
vonBieren

[11] Patent Number: 5,098,189
[45] Date of Patent: Mar. 24, 1992

[54] ION-SUPPRESSED RING LASER GYRO FRAMES

[75] Inventor: Karlheinz vonBieren, Camarillo, Calif.

[73] Assignee: Litton Systems Inc., Beverly Hills, Calif.

[21] Appl. No.: 497,157

[22] Filed: Mar. 21, 1990

[51] Int. Cl.⁵ .............................................. G01C 19/66
[52] U.S. Cl. ...................................... 356/350; 372/94
[58] Field of Search .......................... 356/350; 372/94

[56] References Cited
U.S. PATENT DOCUMENTS
4,821,281 4/1989 Lind et al. ............................ 356/350

*Primary Examiner*—Samuel Turner
*Attorney, Agent, or Firm*—Roy L. Brown

[57] ABSTRACT

A ring laser gyro frame of ceramic material having therein lithium ions for dimensional stability over a change in temperature. Either a slot is formed in the ceramic material, a secondary negative electrode is placed spaced apart from the ceramic material to warp the electric field, or both.

13 Claims, 6 Drawing Sheets

ION-SUPPRESSED RING LASER GYRO FRAMES

This invention pertains to the reduction in ion migration in the frames of ring laser gyros. Specifically, it pertains to lithium ion migration in ring laser gyro structures using materials containing lithium oxide, $Li_2O$.

BACKGROUND OF THE INVENTION

Ring laser gyros use ring lasers that are formed in solid blocks of material that, over a wide temperature range, are resistant to expansion.

Several proprietary materials, such as the material known by the Trademark, Zerodur, exhibit excellent dimensional stability over wide temperature ranges. The stability is found to be related to the presence of lithium oxide in the material. The mentioned Zerodur, for example, has approximately 2.3% lithium oxide, and to prevent the altering of the temperature stability of the material, the ions of lithium need to be prevented from migrating.

It is usual to bore a laser path in a block of the temperature stable material and to place mirrors at the corners of the path. The mirrors are usually frequency sensitive and very narrow band mirrors so that their reflectivity in the desired laser frequency band is almost 100%. To achieve that reflectivity, the mirrors are coated with multiple layers of differing materials. Those differing materials cannot be contaminated without changing their indices of refraction and altering the characteristics of the mirrors.

Frequently the laser gas within the conduit is excited by placing voltages between spaced-apart anodes and a cathode which are attached to or embedded in the laser block. The portion of the laser path between the cathode and the anodes is designated the gain bore.

Usually the anodes are grounded. Other parts of the support structure for the laser gyro are metallic, and they are also grounded. When these grounded parts contact the last block, such parts become positive means for producing an electric field, and a voltage is placed between such means for producing an electric field and the cathode surfaces which are in contact with the last block.

The voltages between any positive means for producing an electric field and the cathode create an electric field in the laser block and in the mirrors, tending to force lithium ions away from such electrodes and toward the cathode, sweeping the lithium ions from the laser block and altering its temperature stability. Further, the ions may be swept into a mirror coating, thereby altering the indices of refraction of the films of the coating.

Another detrimental symptom occurs at the cathode seal; The lithium ions, arriving at the cathode, are neutralized by electrons as soon as they reach the metal. Hence lithium atoms accumulate at the cathode seal surface and endanger the integrity of the seal.

Suppression of ion flow into the mirrors has been achieved by surrounding the mirrors with insulating collars which do not contain lithium or other migrating ions.

BRIEF DESCRIPTION OF THE INVENTION

The structure of this invention has two major features which are used alone or in combination. The first feature is to insert an air gap in the direct path between positive means for producing an electric field and the cathode. The second feature is to use auxiliary cathodes adjacent either the above-mentioned air gap or adjacent the positive means for producing an electric field to warp the electric field to direct the ions away from the cathode of the ring laser.

It is therefore a feature and object of this invention to reduce lithium ion migration in a ceramic block.

More specifically, it is a feature and object of the invention to reduce such ion migration in a ring laser gyro frame.

It is a still more particular feature and object of the invention to place slots between electrodes in the frame of a ring laser gyro to reduce lithium ion migration.

It is yet a more particular feature and object of the invention to use auxiliary cathodes to warp the electric field in the frame of a ring laser to limit the migration of lithium ions.

It is a broader feature and object of this invention to limit the migration of positive ions in solid materials.

Other objects will become apparent from the following description, taken together with the following description.

DESCRIPTION OF THE PREFERRED EMBODIMENTS

Figure 1:
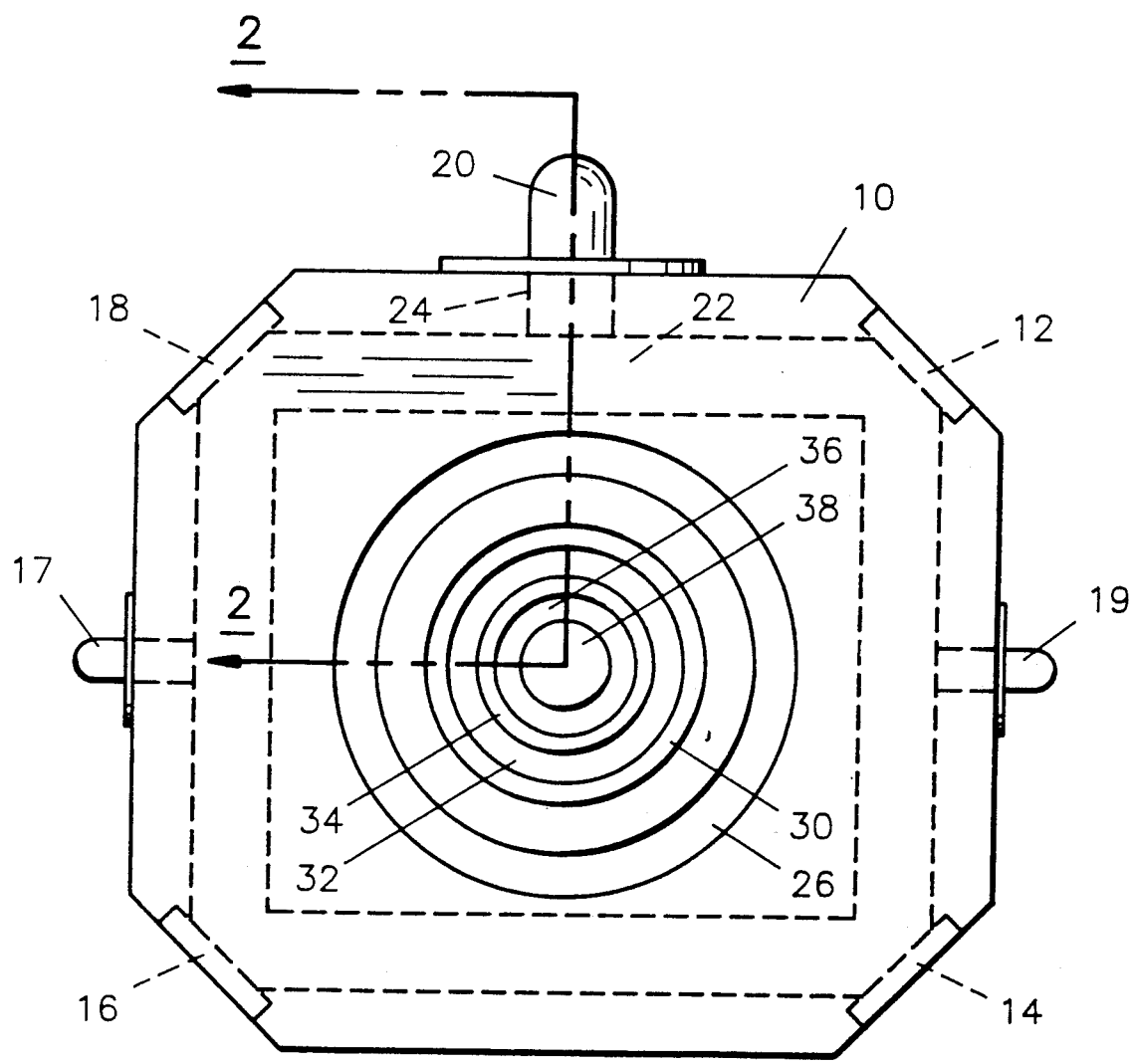
FIG. 1 is a plan view of a ring laser showing the positions of a laser cathode, laser anodes, and other positive means for producing an electric field and showing a slot in the frame, between positive means for producing an electric field and the flanges of the cathode which contact the laser body, to limit lithium ion migration.

Ring lasers of ring laser gyros use the most dimensionally stable frames available. The most stable frames now available are ceramic frames containing lithium oxide. The ring lasers are formed in gas-filled tunnels or bores 22 within a frame 10. Usually the laser has three or four multiple film coated mirrors 12, 14, 16, 18 at the ring laser bore junctions. The multiple films are carefully crafted of materials having particular indices of refraction and thickness to produce highly efficient narrow band mirrors. A mirror might have better than 99.99% reflectivity at the laser frequency.

A laser gas, such as a helium and neon mixture may be in the bore 22. To energize that gas to create counterpropagating ring laser beams, it is customary to place a voltage between a pair of anodes 17, 19 and a cathode 20. A flow of ions through the gas between the cathode 20 and the anodes 17 and 19 energizes the gas and produces two counterpropagating ring laser beams in the bore 22. Note that the cathode 20 is shown outside of the frame 10, and the anodes 17, 19 are shown inside of the frame 10. Whether the electrodes are inside or outside of the frame is a choice for the designer, and the electrodes are shown only as an example.

The flex ring 32,34 adjusts for differences in expansion between the ring 34 and the frame 10. The support ring 34 and the metallic flex ring 32 34 are usually of Invar. The ring 34 is usually mounted upon a supporting post 38. Positive voltage is delivered to the anodes 17 and 19. The high voltage power supply (not shown) providing the potential between anodes 17 and cathode 20 is usually connected with its positive terminal connected to the ground potential. Since the metallic support ring 34 is also grounded, an electric potential is set up between the flanges of the cathode and the contacting electric field producing means of the metallic flex ring 32 and 30.

Thus, the surfaces of flex ring 30 contacting the frame 10 become an electric field producing means having thereon a positive voltage. The metallic flange of the cathode 20 also contact the frame 10 and carry a negative voltage. An electric field is created within the frame 10 between the electric field producing means 30 and the metallic flanges of the cathode 20. If no measures are taken to intercept the electric field with a blocking space, lithium ion migration takes place along electric field lines.

Figure 2:
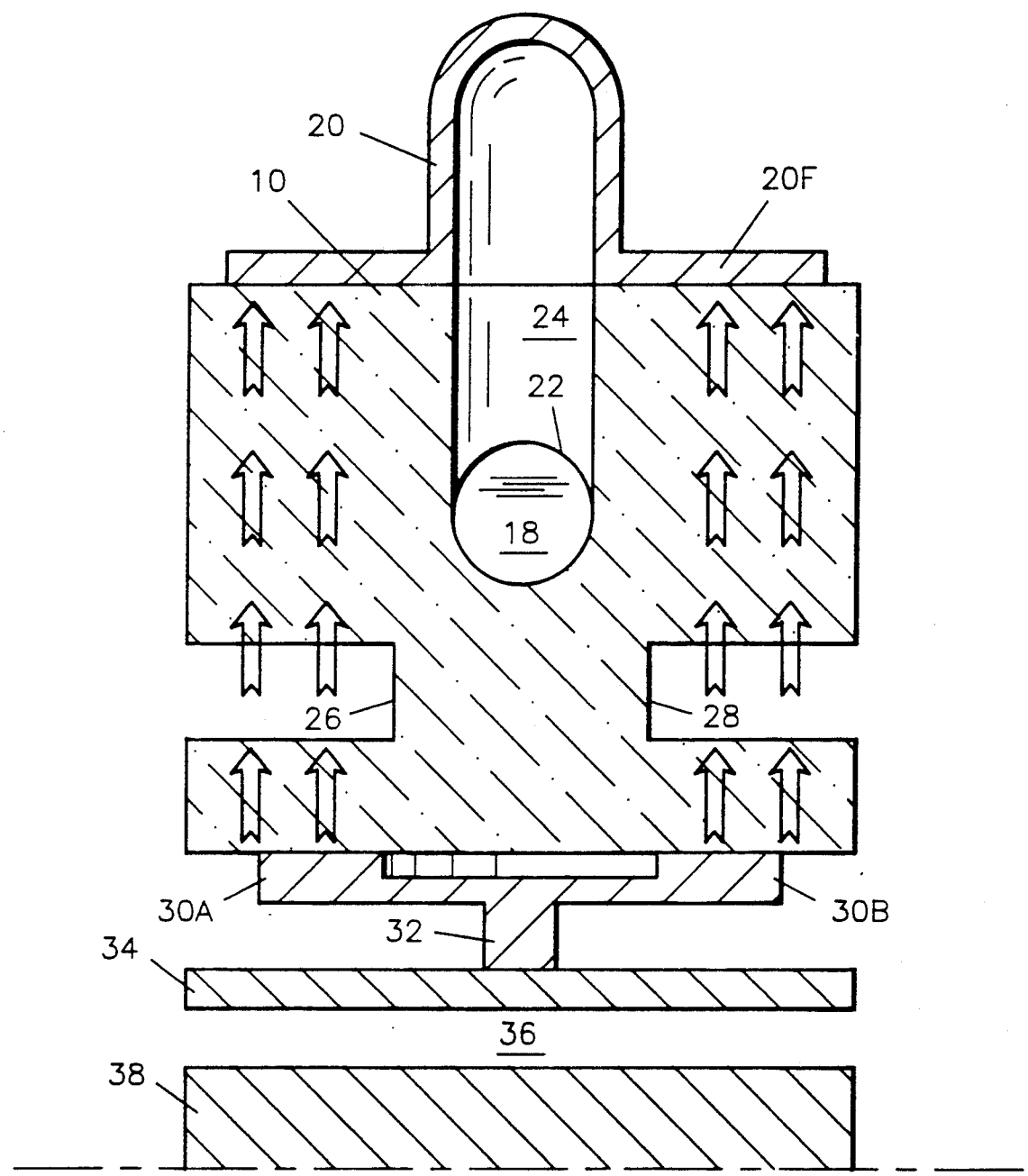
FIG. 2 is a view, partly in section, taken at 2—2 in FIG. 1.

The first means for reducing or prevent lithium ion migration, shown in FIGS. 1 and 2, is to cut slots 26 and 28 in the two faces of the frame 10, between the positive contacting surfaces 30A, 30B of the positive flex ring and the flange 20F of the cathode. The electric fields through the frame 10 are shown by the heavy arrows, but the flow of ions is blocked by the slots 26 and 28.

Figure 3:
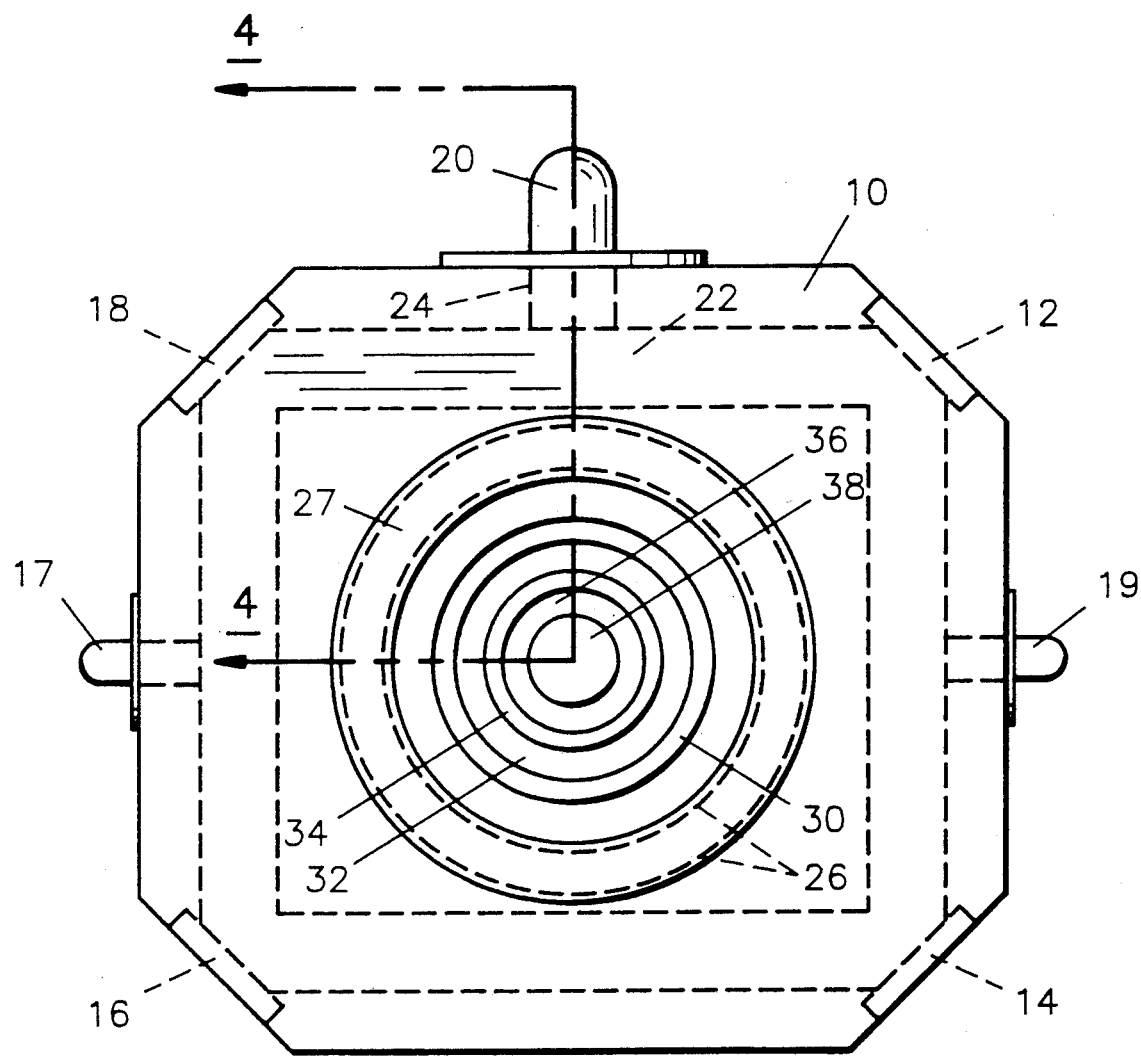
FIG. 3 is a plan view of a ring laser showing the positions of a laser cathode, laser anodes, and other positive means for producing an electric field, showing a slot in the frame, between positive means for producing an electric field and the flanges of the cathode which contact the laser body, to limit lithium ion migration, and showing adjacent such slot to warp the electric field in the ring laser frame.
Figure 4:
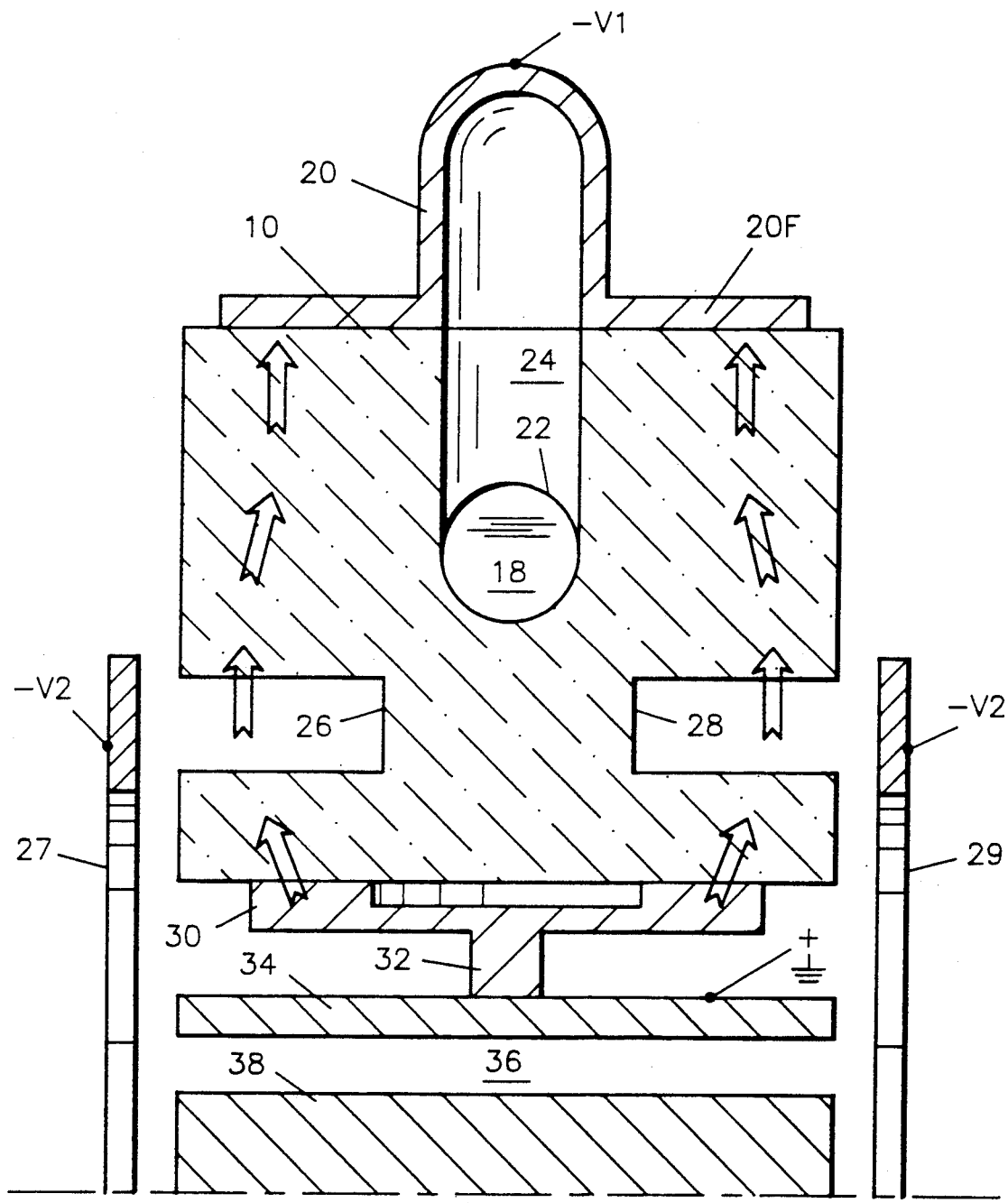
FIG. 4 is a view, partly in section, taken at 4—4 in FIG. 3.

FIGS. 3 and 4 show a second embodiment of the invention wherein the depth of the slots 26 and 28 are reduced, and the electric field lines are warped to force them to penetrate the shallower slot. The warping occurs from negatively charged electrodes 27 and 29 which may have thereon the same or a different negative voltage from the voltage on the cathode flange 20F.

Figure 5:
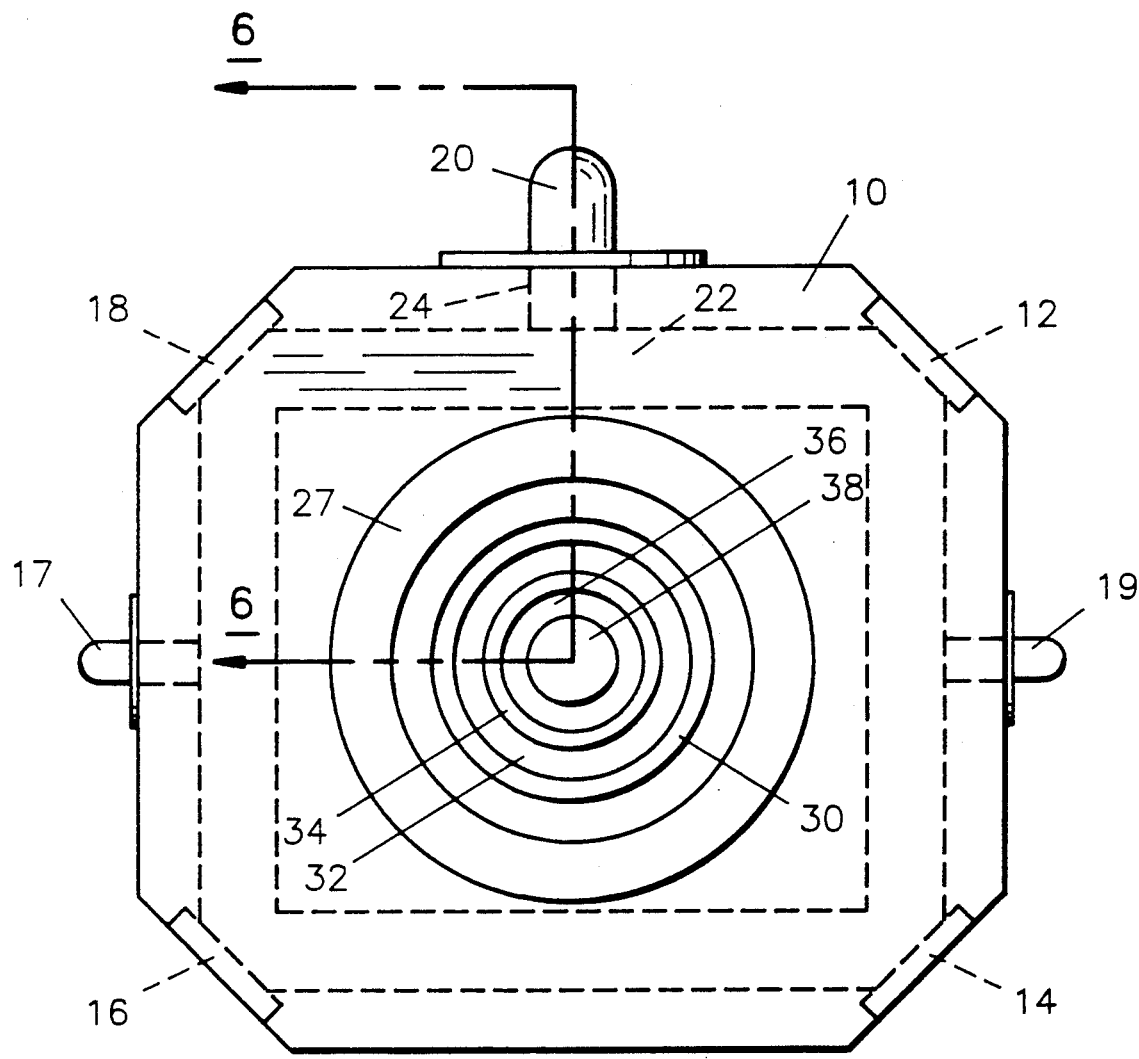
FIG. 5 is a plan view of a ring laser showing the positions of a laser cathode, laser anodes, and other positive means for producing an electric field and showing auxiliary negative means for producing an electric field adjacent such positive means for producing an electric field to warp the electric field in the ring laser frame.
Figure 6:
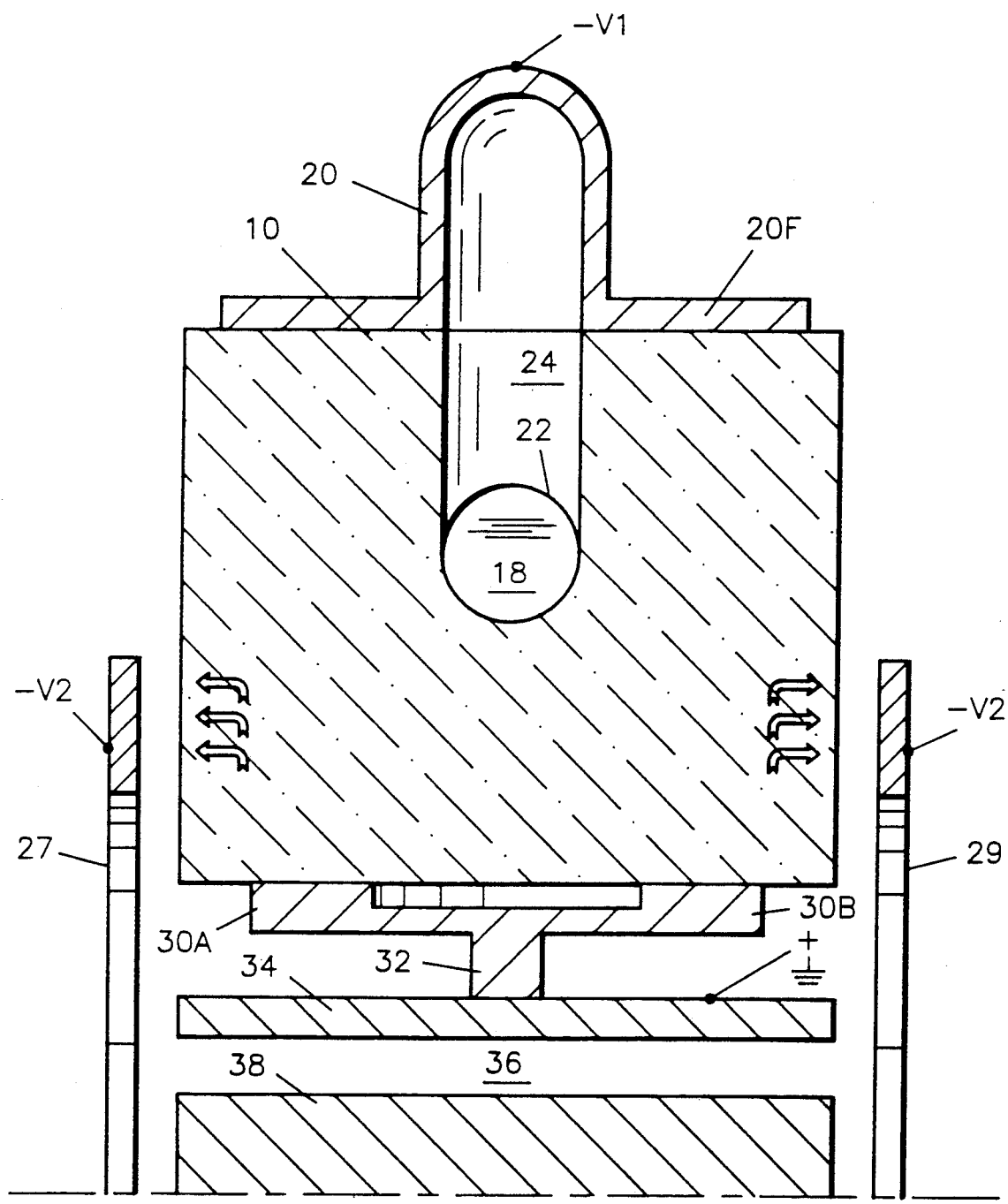
FIG. 6 is a view, partly in section, taken at 6—6 in FIG. 5.

FIGS. 5 and 6 show a third embodiment of the invention wherein only a pair of negative electrodes 27 and 29 are positioned near the rings 30A and 30B of the flex ring 30. The negative voltages on electrodes 27 and 29 completely distort the electric field, causing it to terminate on those electrodes.

In the embodiments using the electrodes 27 and 29, note that those electrodes never contact the frame 10. Consequently, there is always an air or gas gap in the electric field, and ion flow in the frame is substantially eliminated.

Although the invention has been described in detail above, it is not intended that the invention shall be limited by that description, but only by the appended claims taken together with that description.

I claim:

1. A ceramic block having free ions in the material thereof;

positive and negative electric field producing means, positioned on faces of said block so application of a voltage between said field producing means produces an electric field in said block;

and means forming at least one gas gap within said block and in said electric field to stop ion flow in said block.

2. A structure as recited in claim 1 wherein said ceramic block is a ring laser frame with its cathode having flanges contacting said frame;

and said ring laser frame is supported by conductive structure positioned radially inward from said cathode and having a positive voltage thereon, said one gap being circumferential and radially positioned between said conductive structure and said cathode flanges to stop ion migration in said block.

3. A structure as recited in claim 2 wherein said free ions are lithium ions.

4. A structure as recited in claim 3 wherein said frame contains lithium oxide.

5. A structure as recited in claim 4 in which said means forming said at least one gas gap comprises at least one gap in said frame, positioned to stop ion flow in said block.

6. A structure as recited in claim 5 and further comprising at least one negative auxiliary means for producing an electric field, each spaced apart from said frame adjacent one of said at least one gap to warp the electric field within an adjacent said gap to reduce ion flow within said block.

7. A structure as recited in claim 4 in which said means forming a gas gap comprises at least one negative means for impressing an electric field, spaced apart from said frame adjacent said conductive structure.

8. A ring laser frame for a ring laser gyro, fabricated of ceramic material having an ion content for thermal dimensional stability;

a plurality of positive and negative electric field producing means, contacting and producing an electric field in said ceramic material;

means forming at least one gas gap in said frame, between said positive and negative electric field producing means, within the electric field produced by voltage therebetween, to prevent electric field induced ion migration in said frame.

9. Ring laser frame as recited in claim 8 wherein the gas in said at least one gas gap is air.

10. A ring laser as recited in claim 8 and further comprising at least one secondary negative electric field producing means spaced apart from said frame and adjacent one of said at least one gas gap to warp the electric field within and in the region of its adjacent said gas gap, to force the electric field between said field producing means to concentrate in said at least one gas gap and substantially stop ions in said block from migrating to said field producing means.

11. A ring laser as recited in claim 10 in which there are one negative, electric field producing means and two positive electric field producing means contacting said ceramic material;

two gaps formed in said ceramic material, each between a different said positive field producing means and said negative field producing means, and two additional secondary negative electric field producing means positioned adjacent said gaps and spaced apart from said ceramic material to warp the electric field between said positive and negative field producing means to force the electric field between said field producing means to concentrate in said at least one gas gap and interrupt the flow ions between said field producing means.

12. A ring laser frame for a ring laser gyro, fabricated of ceramic material having a lithium oxide content for thermal dimensions stability;
 a plurality of positive field producing means and at least one negative field producing means contacting said ceramic material of said frame;
 and at least one secondary negative field producing means spaced apart from said frame and adjacent said at least one said positive field producing means and said frame, to divert the electric field between said positive and negative field producing means from said at least one negative field producing means contacting said material to said at least one secondary negative field producing means to stop lithium oxide ion migration in said frame.

13. A ring laser as recited in claim 12 in which there are one negative field producing means and two positive field producing means contacting said frame, and two secondary field producing means spaced apart from said frame and adjacent said positive field producing means and said frame to divert the electric field between said positive and negative field producing means contacting said frame to said two secondary negative field producing means to stop ion migration in said frame.

* * * * *